United States Patent Office 3,046,265
Patented July 24, 1962

3,046,265
PROCESS FOR THE POLYMERIZATION OF DIOLE-FINS WITH AN ALKYL ALUMINUM, COBALT HALIDE AND ACETYL HALIDE CATALYST
Stanley M. Hazen, Cheswich, and Leo F. Meyer, Pittsburgh, Pa., assignors to Goodrich-Gulf Chemicals, Inc., Cleveland, Ohio, a corporation of Delaware
No Drawing. Filed Mar. 23, 1960, Ser. No. 16,949
4 Claims. (Cl. 260—94.3)

This invention relates to a process for the polymerization of olefins and more particularly to a process for the polymerization of conjugated diolefinic hydrocarbons, such as 1,3-butadiene, to obtain a polymerization product containing the olefinic polymer preferably predominantly in its cis form.

In accordance with the process of this invention the olefin is polymerized in the presence of a catalyst system containing an organo metallo compound, a cobalt halide and an acetyl halide.

Any organo metallo compound embraced by the following structural formula can be employed in the catalyst system:

$$A_m Me B_n$$

In the above formula A can be a hydrocarbon radical such as an alkyl radical having from one to 10 carbon atoms, for example, methyl, ethyl, propyl, isopropyl, butyl, isobutyl, hexyl, octyl, decyl, etc.; an aryl radical having from 6 to 10 carbon atoms, for example, phenyl, naphthyl, etc.; an aralkyl radical having from 7 to 10 carbon atoms, for example, benzyl, 1-phenyl ethyl, 2-phenyl ethyl, 2-methyl benzyl, 2,3-dimethyl benzyl, 1-p-tolyl ethyl, 1-p-tolyl propyl, etc.; an alkaryl radical having from seven to 10 carbon atoms, for example, o-tolyl, m-tolyl, p-tolyl, o-ethyl phenyl, m-ethyl phenyl, p-ethyl phenyl, 3,5-xylyl, 2,4-xylyl, 2-propyl-p-tolyl, etc. Me is a metal selected from the group consisting of aluminum, boron, gallium, indium, thallium, tin and lead. B is a halogen selected from the group consisting of fluorine, chlorine, bromine and iodine or it can be hydrogen. The sum of $m$ and $n$ is equal to the valence number of Me, with $m$ being one to the valence number of Me and $n$ from 0 to the valence of Me minus one. Preferably, A is an alkyl group such as an isobutyl group, Me is aluminum and B the chloride radical. Examples of organo metallo compounds which can be employed are: trimethyl aluminum, dimethyl aluminum chloride, methyl aluminum dichloride, triethyl aluminum, diethyl aluminum chloride, ethyl aluminum dichloride, tripropyl aluminum, dipropyl aluminum chloride, propyl aluminum dichloride, triisopropyl aluminum, diisopropyl aluminum chloride, isopropyl aluminum dichloride, triisobutyl aluminum, diisobutyl aluminum chloride, isobutyl aluminum dichloride, dihexyl aluminum chloride, dioctyl aluminum chloride, didecyl aluminum chloride, etc.; triphenyl aluminum, diphenyl aluminum chloride, phenyl aluminum dichloride, trinaphthyl aluminum, dinaphthyl aluminum chloride, naphthyl aluminum dichloride, etc.; tribenzyl aluminum, dibenzyl aluminum chloride, benzyl aluminum dichloride, tri-p-tolyl aluminum, di-p-tolyl aluminum chloride, p-tolyl aluminum dichloride, etc.; trimethyl boron, triethyl boron, triphenyl boron, dimethyl boron chloride, diethyl boron chloride, diphenyl boron chloride, etc.; trimethyl gallium, triethyl gallium, triphenyl gallium, dimethyl gallium chloride, diethyl gallium chloride, diphenyl gallium chloride, etc.; trimethyl indium, triethyl indium, triphenyl indium, dimethyl indium chloride, diethyl indium chloride, diphenyl indium chloride, etc.; trimethyl thallium, triethyl thallium, triphenyl thallium, dimethyl thallium chloride, diethyl thallium chloride, diphenyl thallium chloride, etc.; trimethyl tin chloride, triethyl tin chloride, triphenyl tin chloride, etc.; trimethyl lead chloride, triethyl lead chloride, triphenyl lead chloride, etc. Mixtures containing two or more of the above organo metallo compounds can be employed in the catalyst system if desired.

In admixture with the organo metallo compounds defined above are to be found a halide (fluoride, chloride, bromide or iodide) of cobalt and an acetyl halide (fluoride, chloride, bromide or iodide). Preferred are cobalt chloride and acetyl chloride.

The amount of each of the above compounds present in the catalyst system is extremely important. The molar ratio of organo metallo compound to the cobalt halide is at least about 1:1 and preferably about 2:1 to about 5:1. The amount of acetyl halide present must be at least about 0.5 millimol per mol of olefin, preferably about 2.5 to about 5 millimols per mol of olefin. The combined amounts of said three compounds must be at least about 2.5 millimols per mol of olefin, preferably about 15 to about 25 millimols per mol of olefin.

Any conjugated diolefin containing at least one $CH_2=C<$ group can be polymerized in accordance with the process of this invention. In general olefins which can be employed will have from 4 to 20 carbon atoms in their structure, preferably from 4 to 8 carbon atoms. Olefins which can thus be employed are 1,3-butadiene, isoprene, 1,3-hexadiene, 2-methyl-1,3-pentadiene, 4-methyl-1,3-pentadiene, 2,3 - dimethyl - 1,3 - butadiene, 2-ethyl-1,3-butadiene, 1,3-heptadiene, 5-methyl-1,3-hexadiene, 1,3-tetradecadiene, 1,3-hexadecadiene, 1,3-octadecadiene, 1,3-eicosadiene, etc.; aromatics having conjugated diolefin side chains such as 2-phenyl-1,3-butadiene, 1-phenyl-2,3-dimethyl-1,3-butadiene, etc. Mixtures of two or more of such olefins can be used in the charge. Of the olefins defined above, 1,3-butadiene is preferred since the polymer obtained is predominantly cis-polybutadiene, a high molecular weight, solid polymer particularly useful in the preparation of synthetic rubber tires because of its tackiness and ability to dissipate heat readily.

Excellent results are obtained in accordance with the instant process at relatively low temperatures. Thus the temperature can be from about —25° C. to about 100° C., preferably about 0° to about 10° C. Pressure is not critical and can be, for example, from about atmospheric to about 500 pounds per square inch gauge, preferably about atmospheric to about 30 pounds per square inch gauge. Reaction time, is of course dependent upon the many other variables involved, but in general can be from about one to about 50 hours.

The polymerization reaction of this invention is preferably carried out in the presence of a small amount of solvent or diluent for the purpose of obtaining fluidity of the reaction mixture and maintaining efficient heat removal. Solvents or diluents which can be employed are aliphatic, aromatic, cycloaliphatic, etc., hydrocarbons which do not react with the reactants or product obtained or otherwise adversely affect the course of the polymerization reaction. Solvents which can thus be employed are hexane, heptane, benzene, toluene, cyclohexane, etc. The amount of solvent which can be employed can vary over a wide range, but in general about 2 to about 10 volumes per volume of olefin would be satisfactory.

After the reaction has been permitted to proceed to the desired point, the catalyst is deactivated and the polymerization terminated in any suitable manner, for example, by admixing with the reaction product a catalyst deactivator such as air, water, alcohols such as methanol, ethanol, propanol, etc., acids such as hydrochloric acid, etc., in an amount, relative to the total compounds in the catalyst system, of about 50 to about 100 percent by weight or more. Separation of catalyst deactivator from the polymerized product can be effected in any manner, for example by filtration, and the polymerized product remaining can be stabilized by combining therewith any conventional synthetic rubber antioxidant such as ditertiary butyl hydroquinone, phenyl-$\beta$-naphthylamine or any commercially available rubber antioxidant.

The process of this invention can further be illustrated by reference to the following examples whose data are recorded below in Table I. In each example wherein cobalt chloride was employed it was prepared by heating cobalt chloride hexahydrate for about five hours at a maximum temperature of 572° F. while passing anhydrous hydrogen chloride over it under a nitrogen atmosphere until the cobalt chloride contained no less than about 5 percent by weight of water. While the cobalt chloride was prepared in such manner it can be prepared in any suitable manner provided it is substantially anhydrous and contains less than about 5 percent by weight of water chemically, physically or otherwise associated therewith. Cobalt acetylacetonate used in Examples VII and VIII was also in its anhydrous form.

The following procedure was employed in each example. To a clean, dried and nitrogen-flushed container there was added, in the following order, the defined amount of cobalt compound, 500 cubic centimeters of benzene (which had been distilled and stored over sodium), the defined amount of diisobutyl aluminum chloride and where designated, acetyl chloride, acetic anhydride, acetic acid or hydrogen chloride. All of the additions were made to the container in an atmosphere of nitrogen. This solution was agitated every five minutes and "aged" for one hour. Butadiene in an amount of one mol was then added to the container which was held in a rotating bath held at 5° C. for 48 hours. The pressure on the reaction system was initially about 15 to 25 pounds per square inch gauge. At the end of this time the catalyst was deactivated by adding to the reaction mixture 20 cubic centimeters of ammonium hydroxide and 20 cubic centimeters of methyl alcohol. At the end of ten minutes the reaction mixture was transferred from the reactor to 200 cubic centimeters of methyl alcohol. After kneading the polybutadiene several times in methyl alcohol it was separated therefrom and stabilized with 5 cubic centimeters of a solution of Age-Rite white and ditertiary butyl hydroquinone in methyl alcohol and benzene. The data obtained are set forth below in Table I.

*Table I*

| Example | Millimols Per Mol of Butadiene of— | | | | Yield Polybutadiene, Percent By Weight | Percent By Wt. of Cis Structure in Polybutadiene |
|---|---|---|---|---|---|---|
| | Diisobutyl Aluminum Chloride | Cobalt Chloride | Cobalt Acetylacetonate | Acetyl Chloride or Proposed Equivalent | | |
| I | 10 | 5 | | | 22 | 89 |
| II | 10 | 5 | | 2.5 Acetic anhydride. | 0 | 0 |
| III | 10 | 5 | | 2.5 Acetic acid | 1 | |
| IV | 10 | 5 | | 2.5 HCL | 7 | |
| V | 10 | 5 | | 2.5 Acetyl chloride. | 53 | 87 |
| VI | 10 | 5 | | 5 Acetyl chloride. | 79 | 93 |
| VII | 10 | | 5 | | 96 | 79 |
| VIII | 10 | | 5 | 2.5 Acetyl chloride. | 0 | |

The uniqueness of the present process is apparent from the above data. In Example I wherein only diisobutylaluminum chloride and cobalt chloride were employed in the catalyst system the yield of polybutadiene was only 22 percent. The addition of but a small amount of acetyl chloride to this system, as shown in Example V, increased the yield of polybutadiene to 53 percent without adversely affecting the cis structure in the polymer. Additional amounts of acetyl chloride will further increase the yield of polymer as well as its cis structure (see Example VI). That an acetyl halide is specific for this purpose in combination with a cobalt halide is apparent from an inspection of Examples II, III and IV, wherein acetic anhydride, acetic acid and hydrogen chloride, respectively, were employed and extremely poor results were obtained. That the acetyl halide will function only when the cobalt compound is a halide is apparent from an inspection of Examples VII and VIII. In Example VII wherein cobalt acetylacetonate and diisobutyl aluminum chloride are employed, the yield of polybutadiene is excellent, even though the percent cis structure is low. The addition of a small amount of acetyl chloride to such system is shown to be disastrous in Example VIII.

Obviously many modifications and variations of the invention, as hereinabove set forth, can be made without departing from the spirit and scope thereof, and therefore only such limitations should be imposed as are indicated in the appended claims.

We claim:
1. A process for the homo polymerization of conjugated diolefinic hydrocarbons which comprises carrying out the polymerization in the presence of a catalyst system consisting essentially of an aluminum alkyl selected from the group consisting of a trialkyl aluminum, a dialkyl aluminum halide and an alkyl aluminum dihalide, an anhydrous cobalt halide and acetyl halide, wherein the molar ratio of said aluminum alkyl to said cobalt halide is at least about 1:1, the amount of said acetyl halide present being at least about 0.5 millimol per mol of said conjugated diolefinic hydrocarbon, and the combined amounts of said three components in the catalyst system being at least about 2.5 millimols per mol of said conjugated diolefinic hydrocarbon.

2. A process for the homo polymerization of butadiene which comprises carrying out the polymerization in the presence of a catalyst system consisting essentially of an aluminum alkyl selected from the group consisting of a trialkyl aluminum, a dialkyl aluminum halide and an alkyl aluminum dihalide, an anhydrous cobalt halide and acetyl halide, wherein the molar ratio of said aluminum alkyl to said cobalt halide is at least about 1:1, the amount of said acetyl halide present being at least about 0.5 millimol per mol of said conjugated diolefinic hydrocarbon, and the combined amounts of said three components in the catalyst system being at least about 2.5 millimols per mol of said conjugated diolefinic hydrocarbon.

3. A process for the homo polymerization of conjugated diolefinic hydrocarbons which comprises carrying out the polymerization in the presence of a catalyst system consisting essentially of diisobutyl aluminum chloride, anhydrous cobalt chloride and acetyl chloride, wherein the molar ratio of said aluminum alkyl to said cobalt halide is at least about 1:1, the amount of said acetyl halide present being at least about 0.5 millimol per mol of said conjugated diolefinic hydrocarbon, and the combined amounts of said three components in the catalyst system being at least about 2.5 millimols per mol of said conjugated diolefinic hydrocarbon.

4. A process for the homo polymerization of butadiene which comprises carrying out the polymerization in the presence of a catalyst system consisting essentially of diisobutyl aluminum chloride, anhydrous cobalt chloride and acetyl chloride, wherein the molar ratio of said aluminum alkyl to said cobalt halide is at least about 1:1, the amount of said acetyl halide present being at least about 0.5 millimol per mol of said conjugated diolefinic hydrocarbon, and the combined amounts of said three components in the catalyst system being at least about 2.5 millimols per mol of said conjugated diolefinic hydrocarbon.

References Cited in the file of this patent

UNITED STATES PATENTS

| | | |
|---|---|---|
| 2,905,659 | Miller | Sept. 22, 1959 |

FOREIGN PATENTS

| | | |
|---|---|---|
| 534,792 | Belgium | May 1, 1955 |